(12) United States Patent
Van Swearingen et al.

(10) Patent No.: US 7,837,502 B2
(45) Date of Patent: *Nov. 23, 2010

(54) MULTI-SHOT COAXIAL CONNECTOR AND METHOD OF MANUFACTURE

(75) Inventors: Kendrick Van Swearingen, Woodridge, IL (US); Nahid Islam, Westmont, IL (US)

(73) Assignee: Andrew LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/559,176

(22) Filed: Sep. 14, 2009

(65) Prior Publication Data

US 2010/0041271 A1    Feb. 18, 2010

Related U.S. Application Data

(63) Continuation-in-part of application No. 12/191,922, filed on Aug. 14, 2008, now Pat. No. 7,607,942.

(51) Int. Cl.
    *H01R 9/05*    (2006.01)
(52) U.S. Cl. ..................................... 439/578
(58) Field of Classification Search ............... 439/578; 29/828, 858, 860, 883, 856
    See application file for complete search history.

(56) References Cited

U.S. PATENT DOCUMENTS

| | | | |
|---|---|---|---|
| 5,137,470 A | 8/1992 | Doles | |
| 5,354,217 A | 10/1994 | Gabel et al. | |
| 7,275,957 B1 | 10/2007 | Wlos et al. | |
| 7,435,135 B2 | 10/2008 | Wlos | |
| 7,607,942 B1 * | 10/2009 | Van Swearingen | .......... 439/578 |
| 2005/0170692 A1 | 8/2005 | Montena | |

FOREIGN PATENT DOCUMENTS

JP    2007-042415    2/2007

OTHER PUBLICATIONS

European Search Report, related application EP09009691, issued Nov. 30, 2009 by European Patent Office, Netherlands.

* cited by examiner

*Primary Examiner*—Phuong K Dinh
(74) *Attorney, Agent, or Firm*—BabcockIP, PLLC

(57) ABSTRACT

A coaxial cable connector formed via multi-shot injection molding has a body formed by multiple injection molding layers of different injection moldable materials about a central inner contact to form an integral connector body. The connector body is provided with a coaxial dielectric spacer of dielectric polymer surrounding the inner contact; a coaxial inner body of injection molded metal composition surrounding an outer diameter of the dielectric spacer; and an outer body of polymer surrounding the inner body. Interlock features provide axial and/or rotational interlock between the layers of the connector.

20 Claims, 18 Drawing Sheets

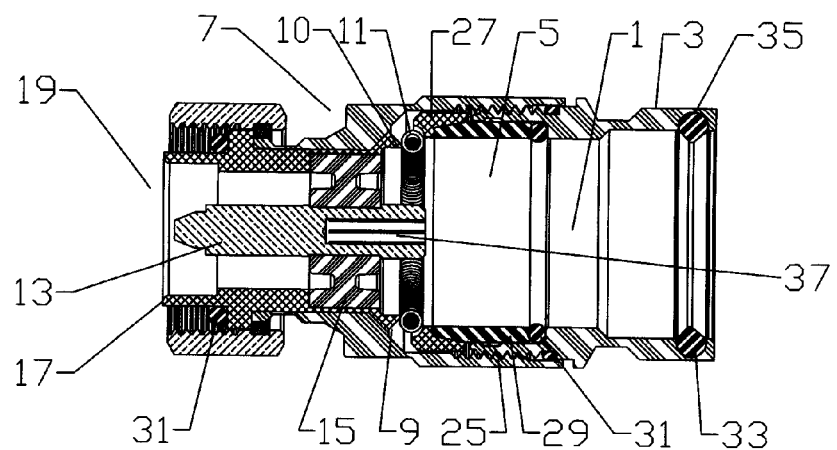
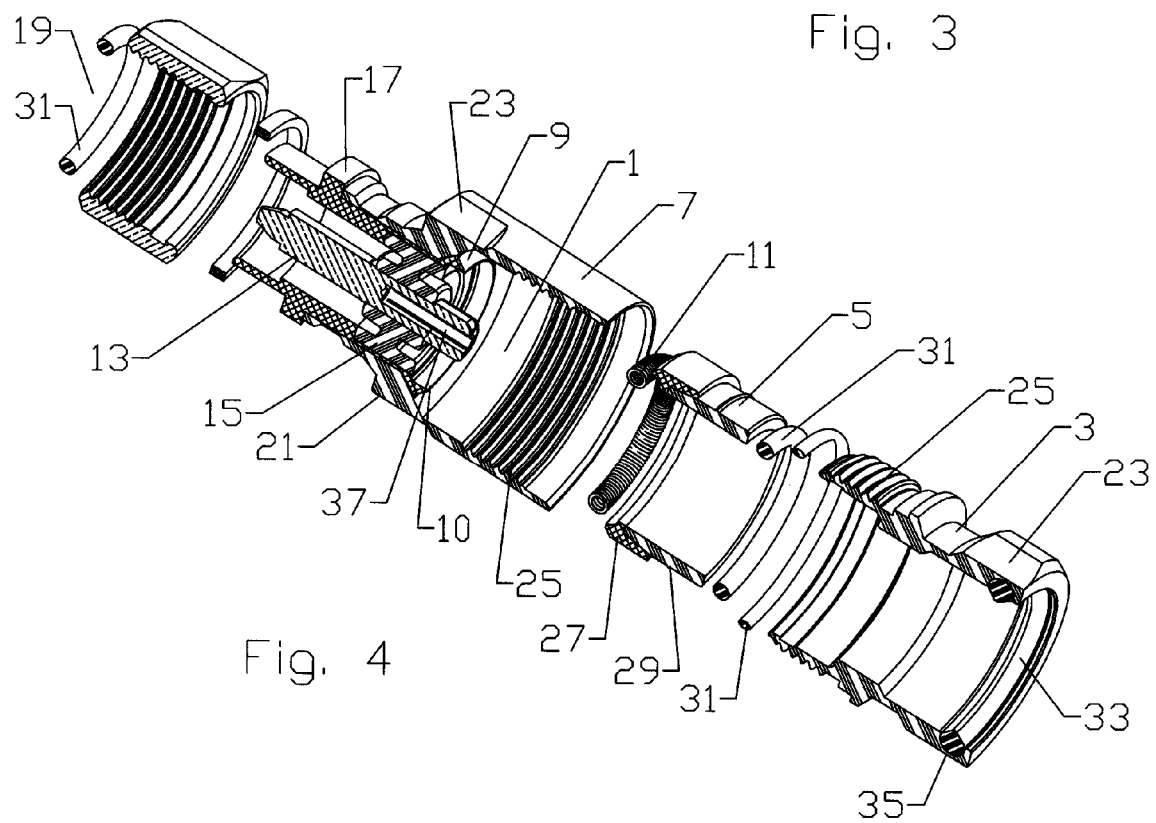
Fig. 3
Fig. 4

MULTI-SHOT COAXIAL CONNECTOR AND METHOD OF MANUFACTURE

CROSS REFERENCE TO RELATED APPLICATIONS

This application is a continuation-in-part of commonly owned co-pending U.S. Utility patent application Ser. No. 12/191,922, titled "Multi-shot Coaxial Connector and Method of Manufacture", filed Aug. 14, 2008 by Kendrick Van Swearingen

BACKGROUND OF THE INVENTION

1. Field of the Invention

The invention relates to an electrical connector. More particularly the invention relates to a lightweight and cost efficient electrical connector for coaxial cable with significant material and manufacturing efficiencies realized by application of multi-shot injection molding technology.

2. Description of Related Art

Connectors for coaxial cable are typically manufactured via precision machining of a plurality of metal and dielectric elements that are then assembled to form the connector assembly.

Machining of metal elements from metal bar stock typically results in significant material waste and requires sophisticated high precision machining/turning equipment and skilled operators for same.

A previous application of polymeric materials to a coaxial connector for use with helical corrugated solid outer conductor coaxial cable is disclosed in U.S. Pat. No. 5,354,217, issued Oct. 11, 1994 to Gabel et al. Polymeric materials are applied to both the connector body and a clamp nut, requiring multiple machined internal conductive elements to form a conductive path for the outer conductor across the connector. However, the separate metal and polymeric elements must each be separately formed, any flashing removed or other rework performed and each of the separate elements assembled together by labor intensive press fit and/or hand assembly operations to complete the connector assembly. Manufacture, quality control, inventory and delivery coordination to the assembly area of each of the plurality of separate elements is a significant additional manufacturing cost. Further, a problem resulting in a delivery delay of any one of the multiple separate elements and or damage or loss during field assembly renders the remainder of the connector inoperable.

In U.S. Pat. No. 5,354,217, the clamp nut threads upon helical corrugations of the outer conductor and the leading edge of the outer conductor is then manually precision-flared against the clamp nut prior to connector assembly. Therefore, the connector is incompatible with smooth or annular corrugated solid outer conductor coaxial cable, is expensive to manufacture and time consuming to install.

Competition within the cable and connector industry has increased the importance of minimizing connector weight, installation time, materials waste, overall number of discrete connector parts and connector manufacturing/materials costs. Also, competition has focused attention upon ease of use, electrical interconnection quality and connector reliability.

Therefore, it is an object of the invention to provide an electrical connector and method of manufacture that overcomes deficiencies in such prior art.

BRIEF DESCRIPTION OF THE DRAWINGS

The accompanying drawings, which are incorporated in and constitute a part of this specification, illustrate embodiments of the invention, together with a general description of the invention given above, and the detailed description of the embodiments given below, serve to explain the principles of the invention. Like reference numbers in the drawing figures refer to the same feature or element and may not be described in detail for every drawing figure in which they appear.

FIG. 3 is a schematic cut-away side view of a second exemplary embodiment.

FIG. 4 is a schematic isometric exploded cut-away side view of FIG. 3.

DETAILED DESCRIPTION

The inventor has recognized that injection moldable metal compositions, usable with conventional polymeric injection molding equipment, enables manufacture of multi-shot combination metal and polymeric material connector assemblies. Thereby, numerous manufacturing steps and the prior need for additional seals between separate elements may be eliminated to realize a significant materials and manufacturing cost savings.

An example of an injection moldable metal composition is "Xyloy"™ M950 available from Cool Poly, Inc. of Warwick, R.I., US. "Xyloy"™ M950 comprises an aluminum and zinc composition delivered in pellet form to injection molding equipment in the same manner as raw polymer pellets. Because the melting point of zinc is comparatively low, a combination of aluminum and zinc results in an alloy with a low enough melting point and viscosity characteristics suitable for use in polymeric injection molding machines without requiring any modification thereto. Other suitable injection moldable metal compositions preferably have melting points and viscosity characteristics that similarly enable use of conventional polymeric injection molding equipment with maximum operating temperatures around 1100 degrees Fahrenheit. Injection moldable metal compositions as described herein above do not require specialized metal injection molding "MIM" equipment, which relies upon application of higher temperatures and/or pressure incompatible with traditional injection moldable polymers to fluidize a metal alloy, such as thixotropic magnesium alloy(s).

Exemplary embodiments of coaxial connectors configured for connection to annular corrugated solid outer conductor coaxial cable are shown in FIGS. 1-4.

Figure 1:
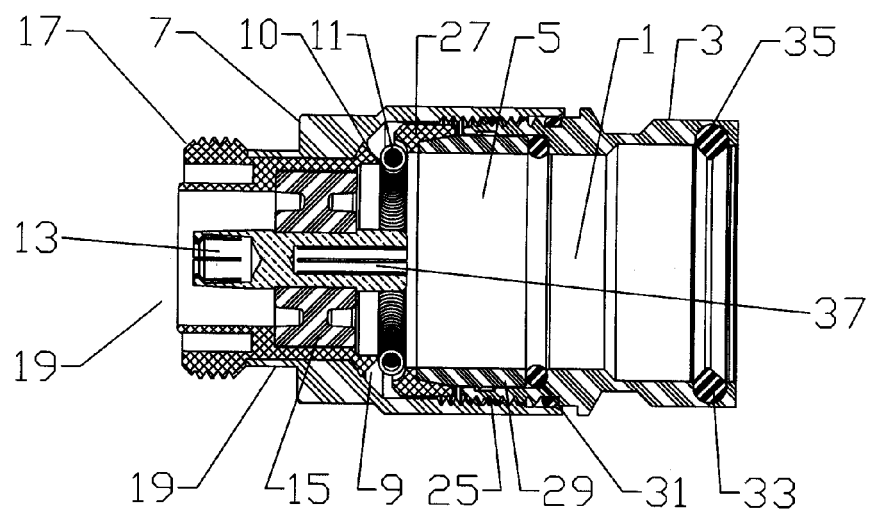
FIG. 1 is a schematic cut-away side view of a first exemplary embodiment.
Figure 2:
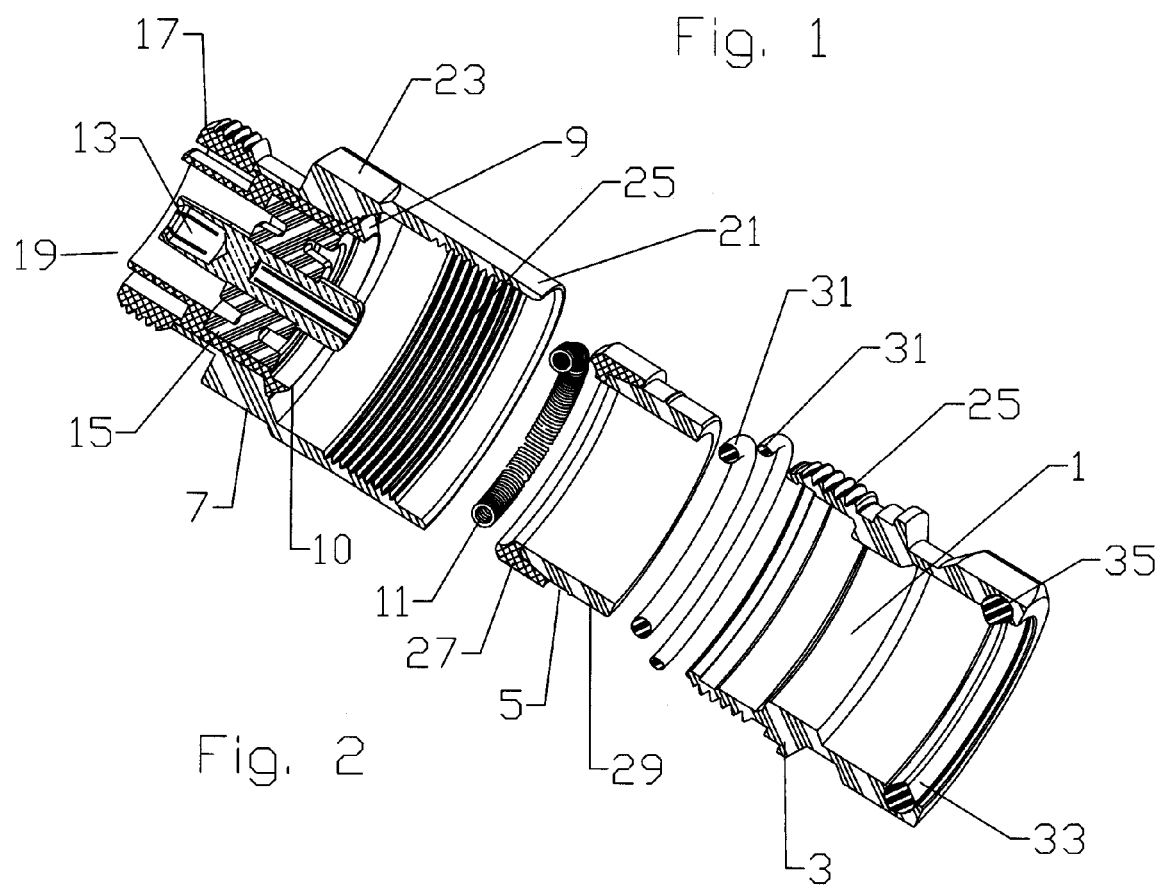
FIG. 2 is a schematic isometric exploded cut-away side view of FIG. 1.

FIGS. 1 and 2 demonstrate a connector configured for the 7-16 DIN Female standard connection interface and FIGS. 3 and 4 demonstrate a connector configured for the 7-16 DIN Male standard connection interface. One skilled in the art will appreciate that any desired standard or proprietary connection interface may be applied. Similarly, alternative cable attachment mechanisms, well known in the art, for example suitable for straight wall or helically corrugated outer conductor coaxial cable, may be applied.

In the exemplary embodiments demonstrated in FIGS. 1-4, the connector is configured for use with annular corrugated outer conductor coaxial cable (not shown). The cable is received through a bore 1 of a coupling body 3, a slip ring 5 and the connector body 7. A leading edge of the outer conductor is retained clamped between an annular ramp surface 9 formed on an end face 10 of an inner body 17 of the connector body 7 and a clamp spring 11, such as a canted coil spring. The clamp spring 11 is pressed against the outer surface of the leading edge by the slip ring 5 driven by the coupling body 3. The slip ring 5 is rotatable independent of the coupling body 3, to minimize the chance for damage to the clamp spring 11 during rotation of the coupling body 3 to thread the coupling body 3 upon the connector body 7, thus applying the clamping force to the leading edge of the outer conductor. An inner conductor of the coaxial cable is received into an inner contact 13 held coaxial within the bore 1 by a dielectric insulator 15.

To minimize metal material costs and the overall weight of the connector, a metal inner body 17 is provided as an outer conductor conductive path between the annular ramp surface 9 and the connection interface 19. A polymeric outer body 21 surrounds the inner body 17 and may include, for example, tool flats 23 for use during connector assembly and or mating threads 25 for the coupling body 3.

The slip ring 5 spring mating surface 27 with the clamp spring 11 may be formed of metal, to avoid polymeric material creep that may occur over time which could prevent easy separation of the clamp spring 11 from the split ring 5 when removed, for example, for periodic inspections of the cable and connector interconnection. A cylindrical slip ring body 29 that maintains coaxial alignment of the slip ring 5 with the coaxial cable may be formed from polymeric material.

Because it is outside of the electrical path, the coupling body 3 may be formed entirely from polymeric material.

Environmental sealing of the connector may be improved by applying environmental seal(s) 31 such as gasket(s) and/or o-rings between the outer conductor and the connector, for example positioned between the slip ring 5 and the coupling body 3 and/or between the connector body 7 and the coupling body 3. A further sheath seal 33, sealing between the coupling body 3 and an outer sheath of the cable may be formed in place upon an outer surface of the coupling body 3 bore 1, for example molded into an annular groove 35. Compared to a conventional o-ring type seal inserted into an annular groove 35, an environmental seal formed in place has a significantly reduced chance for failure and/or assembly omission/error, as the potential leak path between the o-ring and the annular groove 35 and the potential for o-ring slippage out of the annular groove 35 is eliminated.

Although the inner contact 13 may be similarly manufactured by molding, a conventionally machined inner contact 13 is preferred to enable use of beryllium copper and or phosphor bronze alloys with suitable mechanical characteristics for spring finger and/or spring basket 37 features of the inner contact 13 that receive and retain the inner conductor of the cable and/or of the inner conductor mating portions of the mating connector at the connection interface 19.

As used herein, multi-shot injection molding is understood to be an injection molding manufacturing procedure wherein additional layers are injection molded upon a base element and/or prior injection molded layers. Preferably, the portion undergoing molding need not be fully released from the mold. Instead, the portion is retained aligned within the mold nest and only portions of the mold as required to define a further cavity to be injection molded with material are reconfigured. The resulting element is permanently integrated without any mechanical coupling mechanisms, fasteners or assembly requirements. By changing the injection material between metal, dielectric polymer and structural polymers an integral connector element is obtained that is fully assembled upon application of the last layer.

Figure 5:
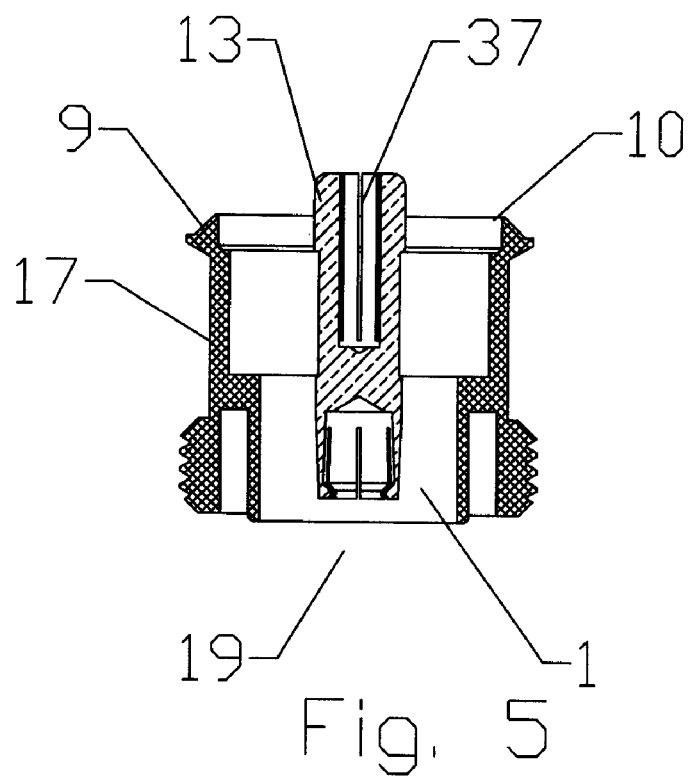
FIG. 5 is a schematic cut-away side view of the conductive sleeve and inner contact of FIG. 1, positioned for injection molding of the dielectric spacer.

In an exemplary method for manufacturing the connector body 7 via multi-shot injection molding, a mold for the conductive sleeve is injected with the injection moldable metal composition, forming the inner body 17 conductive sleeve. An inner portion of the mold is removed and the inner contact 13 positioned therein as shown for example in FIG. 5. Alternatively, the inner contact 13 may be positioned first, and mold portions nested thereupon using the inner contact 13 as an alignment element for the various molding operations.

Figure 6:
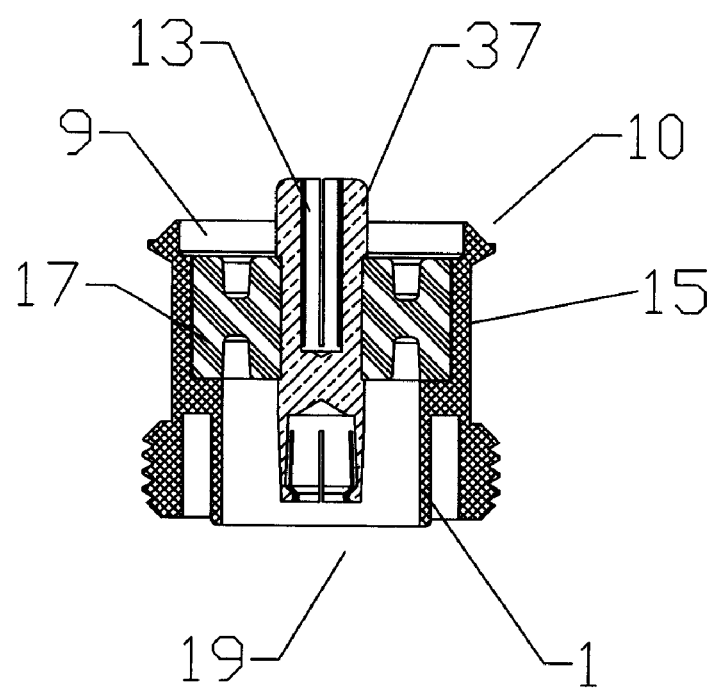
FIG. 6 is a schematic cut-away side view of the conductive sleeve, inner contact and dielectric spacer of FIG. 1.
Figure 7:
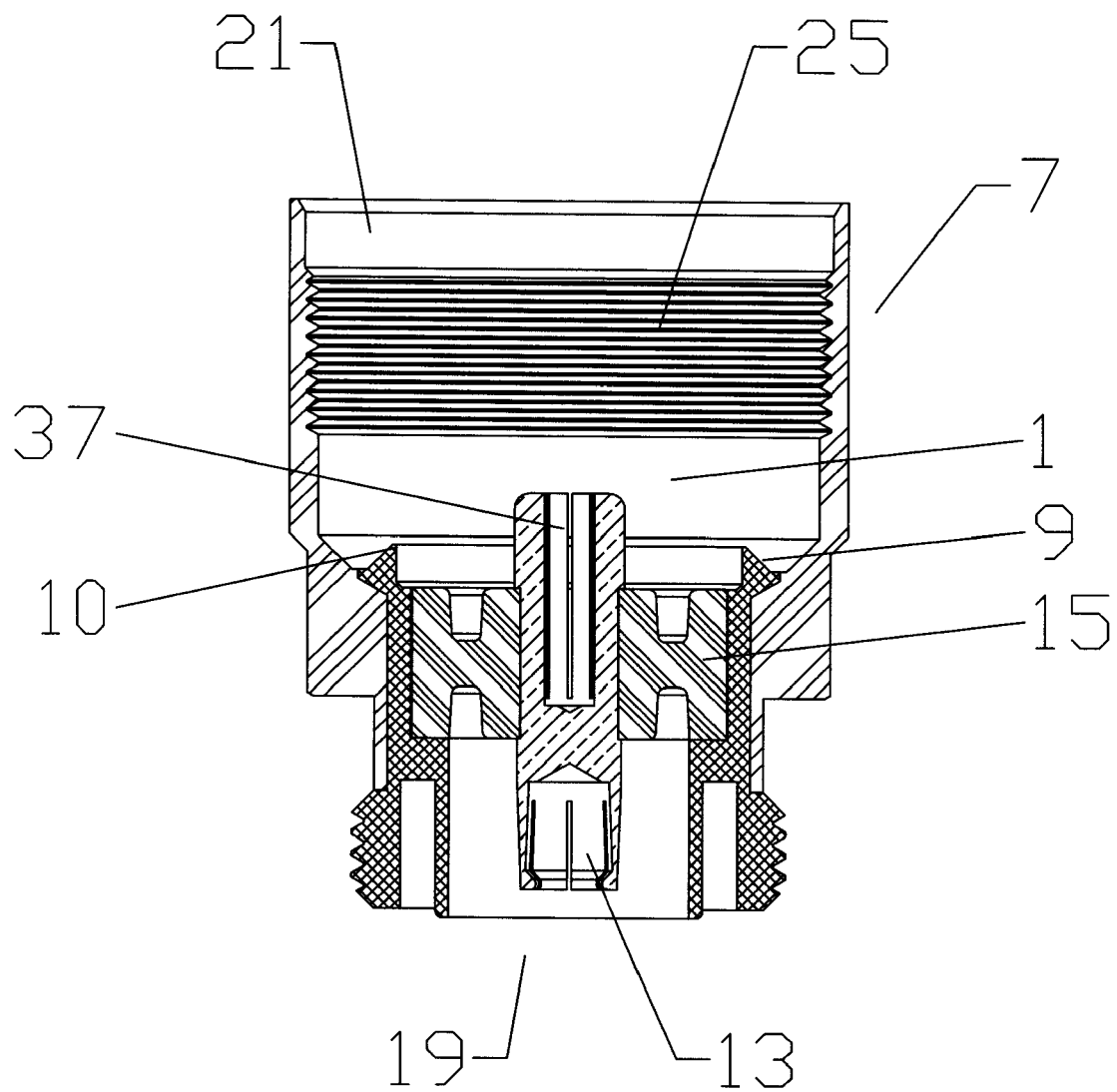
FIG. 7 is a schematic cut-away side view of the multi-shot connector body of FIG. 1.

A space between the inner contact 13 and the inner body 17 is then injected with a dielectric polymer to form the dielectric insulator 15 in situ as shown in FIG. 6. The inner body 17 is also positioned as the core for a molding step wherein a polymer is injected to form the outer body 21 in situ as shown in FIG. 7.

The order of molding is preferably arranged based upon the melting point of the various materials applied with the injection moldable metal composition typically being first, the dielectric polymer second and the outer body 21 polymer last.

Figure 8:
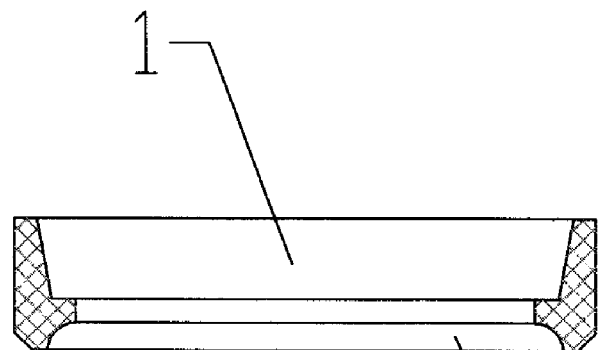
FIG. 8 is a schematic cut-away side view of the slip ring mating surface of FIG. 1.
Figure 9:
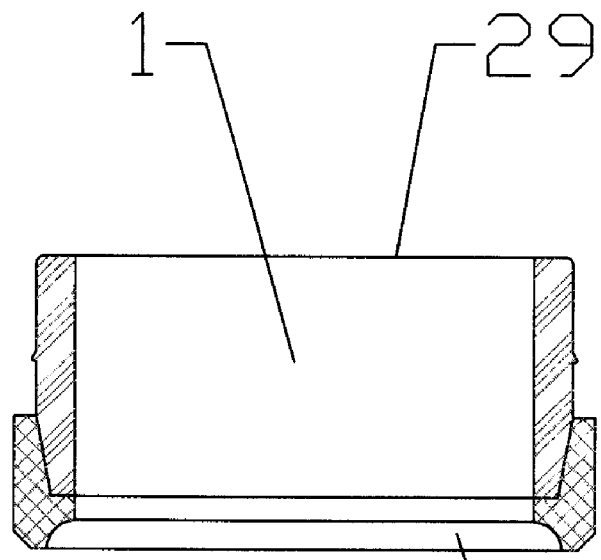
FIG. 9 is a schematic cut-away side view of the slip ring of FIG. 1.

The slip ring mating surface 27, as shown in FIG. 8, may be similarly formed by injecting the injection moldable metal composition into a slip ring mating surface mold, then, if desired, replacing a portion of the mold to form an adjacent cavity for injection of polymeric material to form the slip ring body 29 integral with the slip ring mating surface 27 as shown in FIG. 9.

Figure 10:
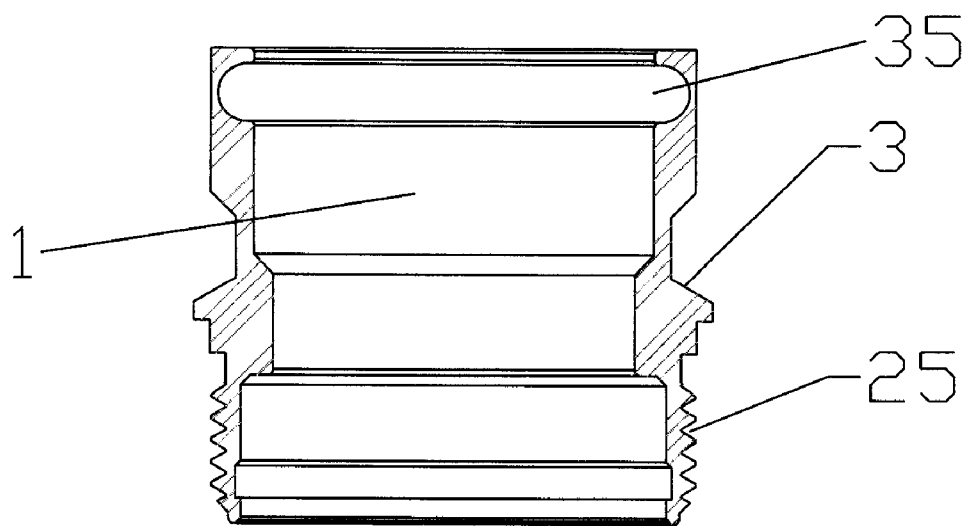
FIG. 10 is a schematic cut-away side view of the coupling body of FIG. 1.
Figure 11:
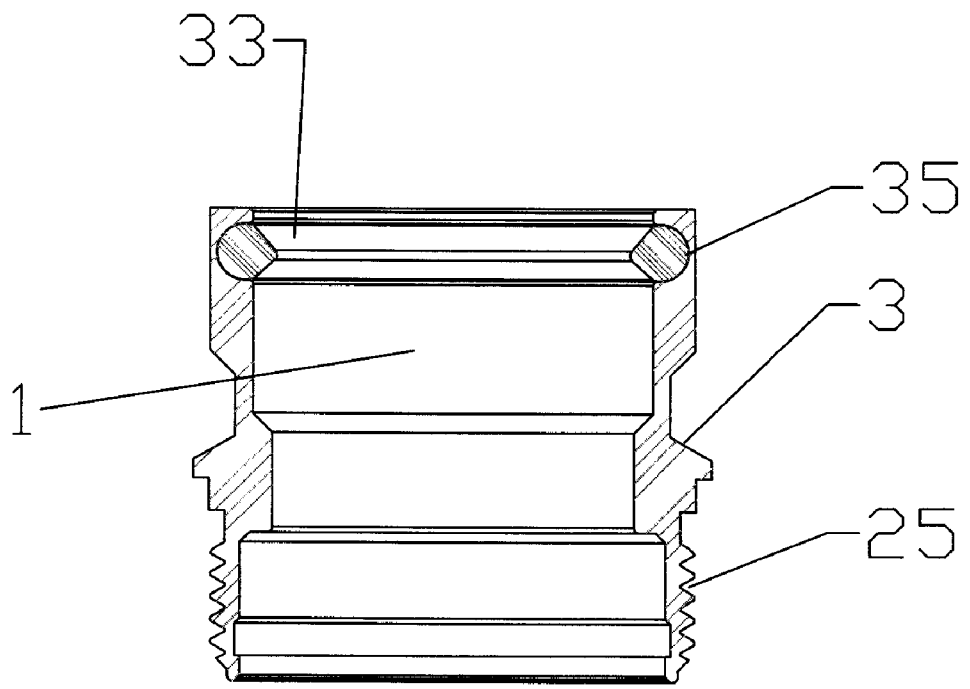
FIG. 11 is a schematic cut-away side view of the coupling body of FIG. 1, including an in situ formed sheath gasket.

The coupling body 3, as shown in FIG. 10, may be formed by injecting a polymer into a coupling body mold. If desired, the coupling body mold may be opened and portions exchanged to form a sheath seal cavity that is then injected with a polymeric gasket material to form the sheath seal 33 in situ, as shown in FIG. 11.

Thereby, the connector is formed in only three main elements that are easily assembled with the desired environmental seal(s) 31, clamp spring 11 and any further connection interface 19 portions to form the connector.

Figure 12:
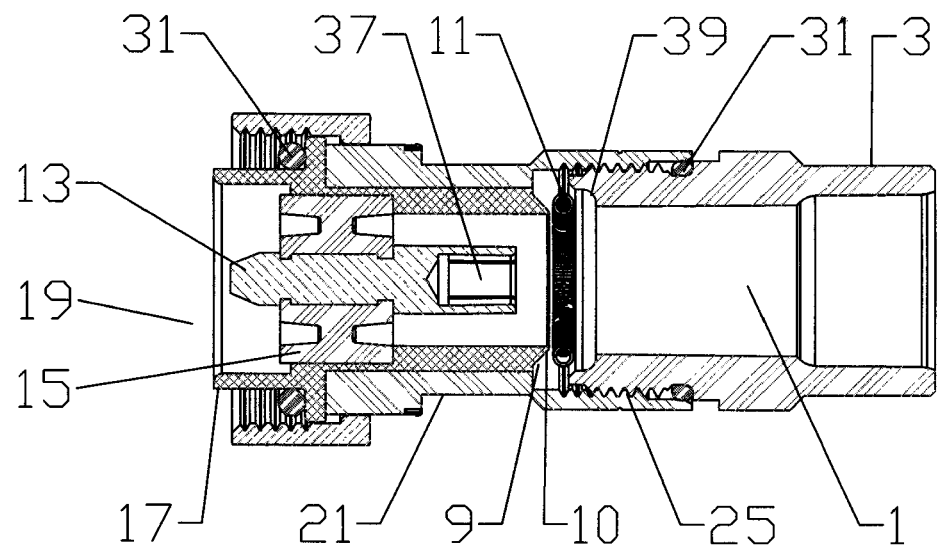
FIG. 12 is a schematic cut-away side view of a third exemplary embodiment.
Figure 13:
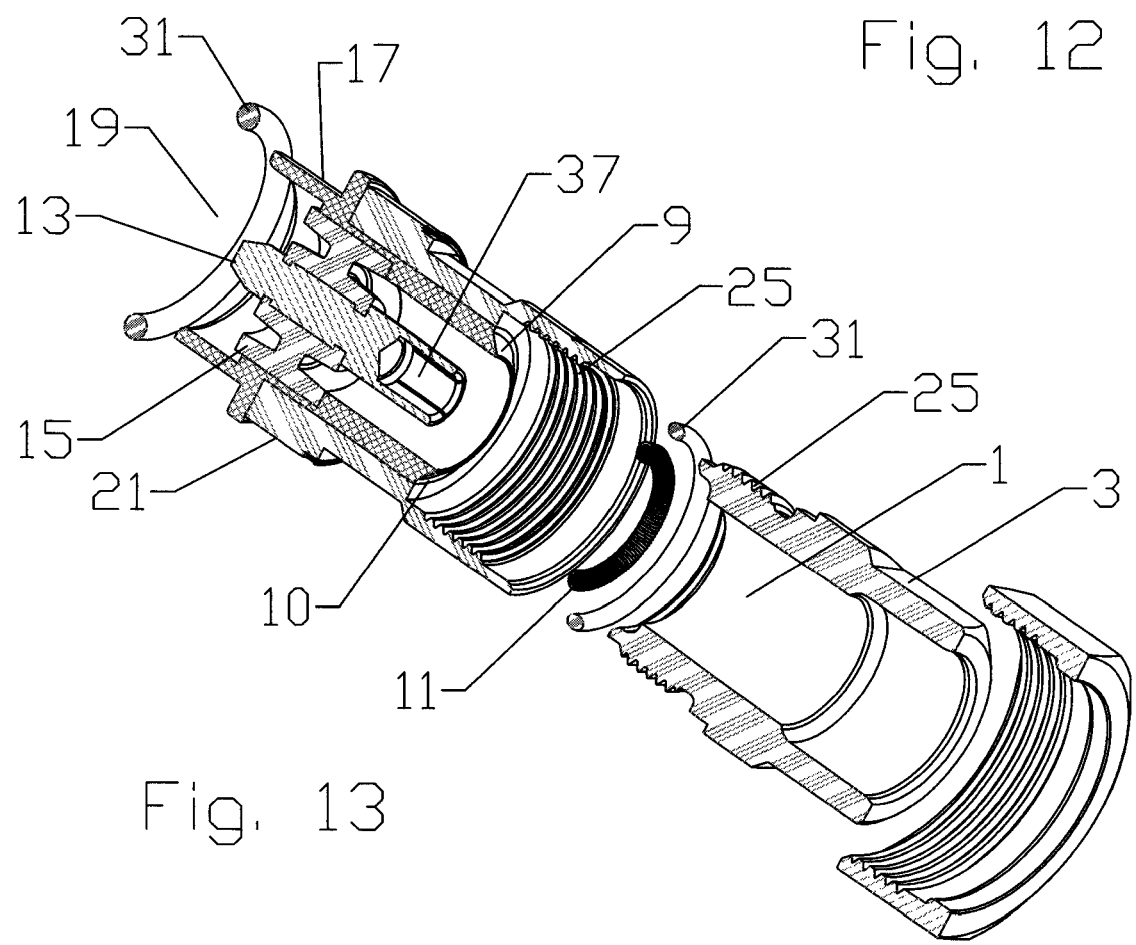
FIG. 13 is a schematic isometric exploded cut-away side view of FIG. 12.
Figure 14:
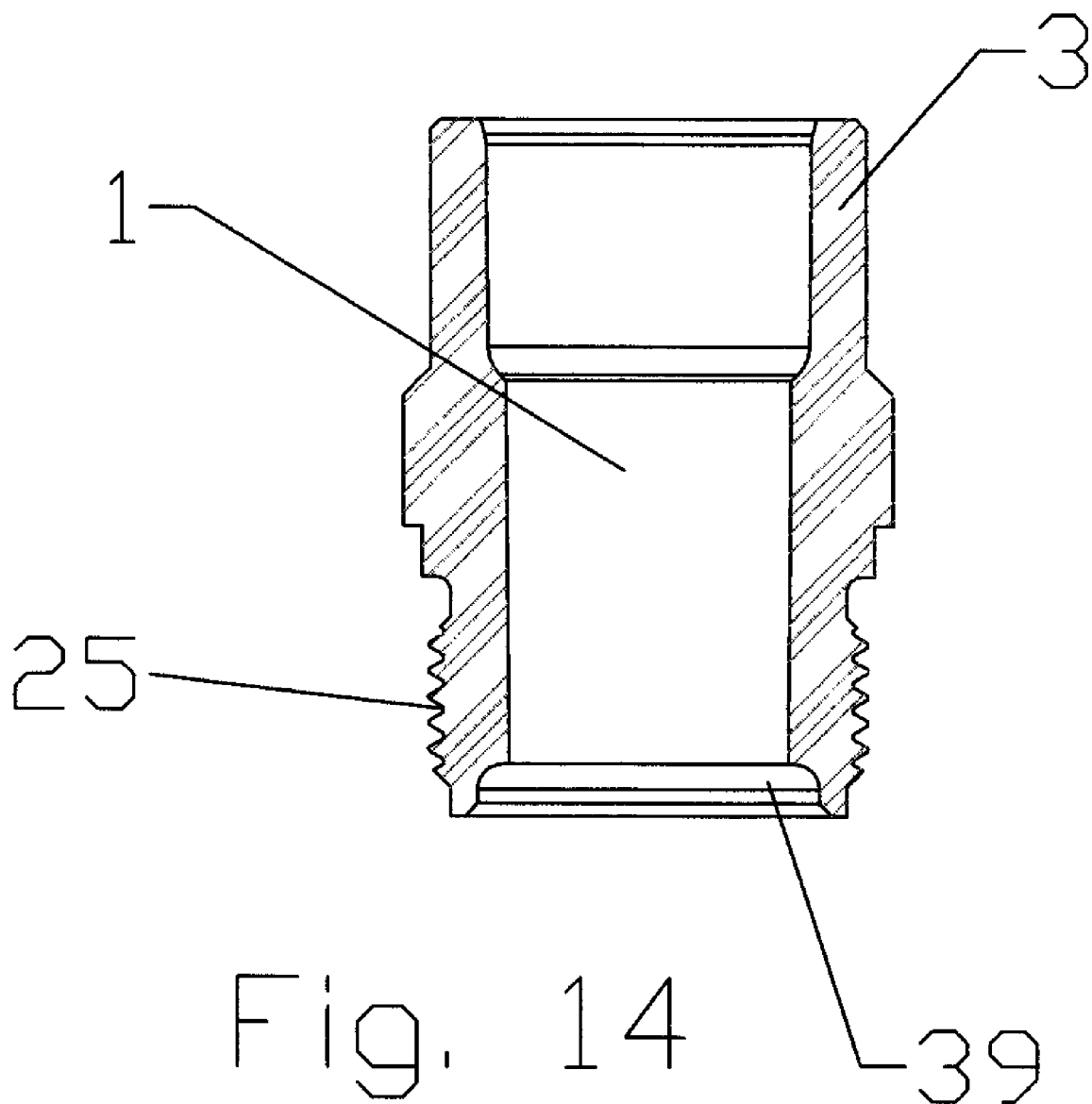
FIG. 14 is a schematic cut-away side view of the coupling body of FIG. 12.

Alternatively, the slip ring 5 may be eliminated by forming the coupling body 3 as a monolithic polymer portion with a clamp ring surface 39 for direct engagement with the clamp spring 11 or the like, as shown for example in FIGS. 12-14.

Figure 15:
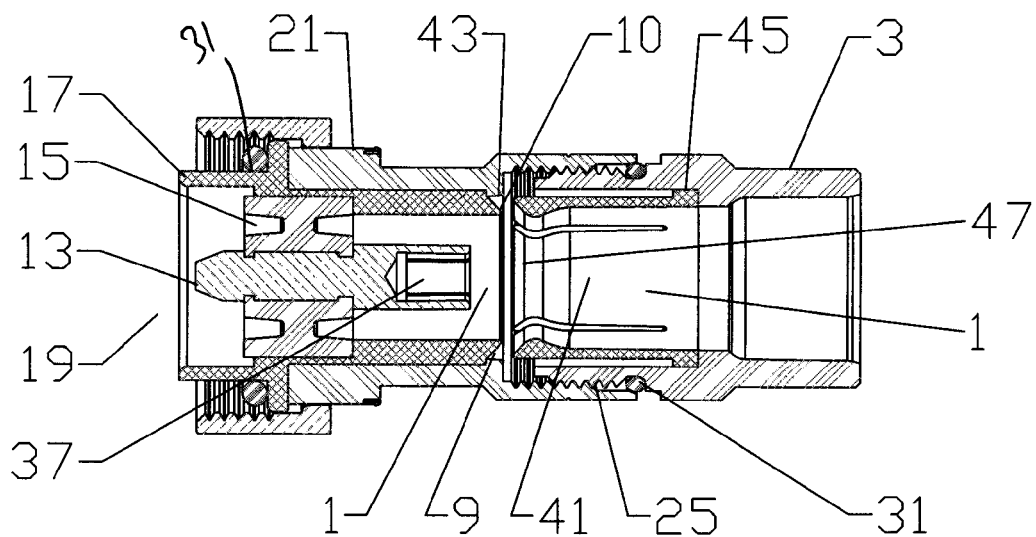
FIG. 15 is a schematic cut-away side view of a fourth exemplary embodiment.
Figure 16:
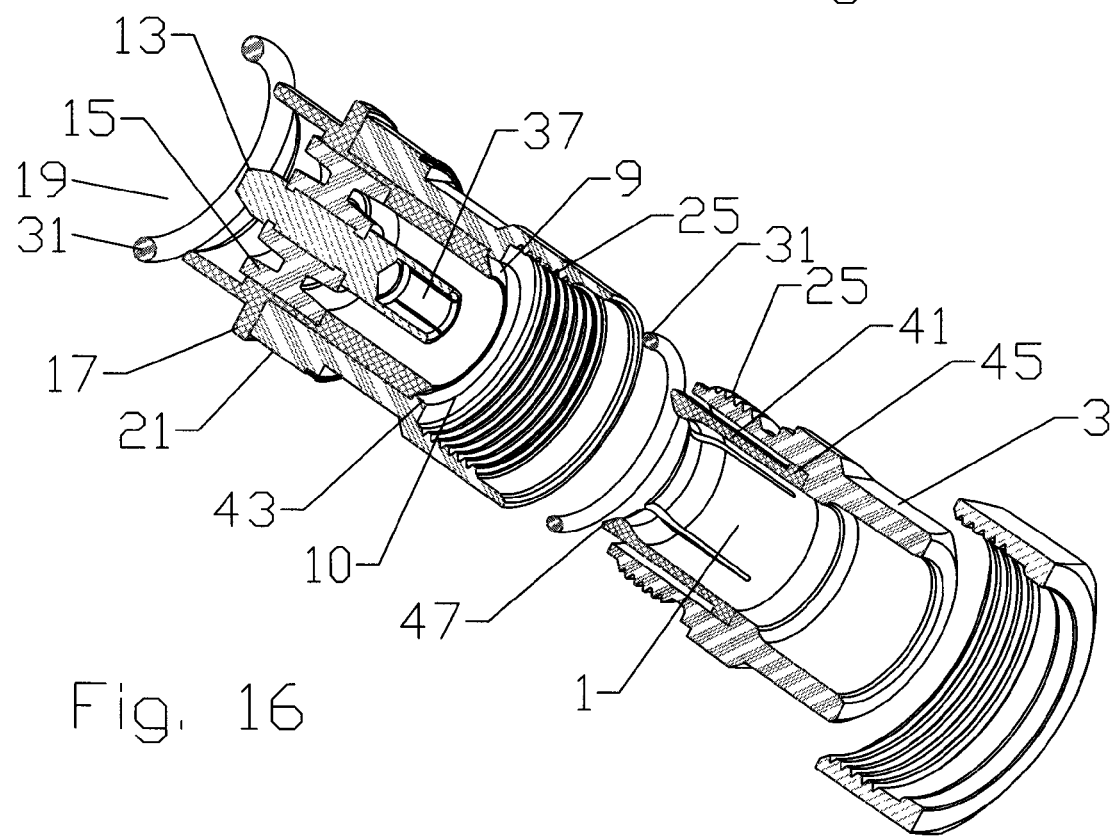
FIG. 16 is a schematic isometric exploded cut-away side view of FIG. 15.
Figure 17:
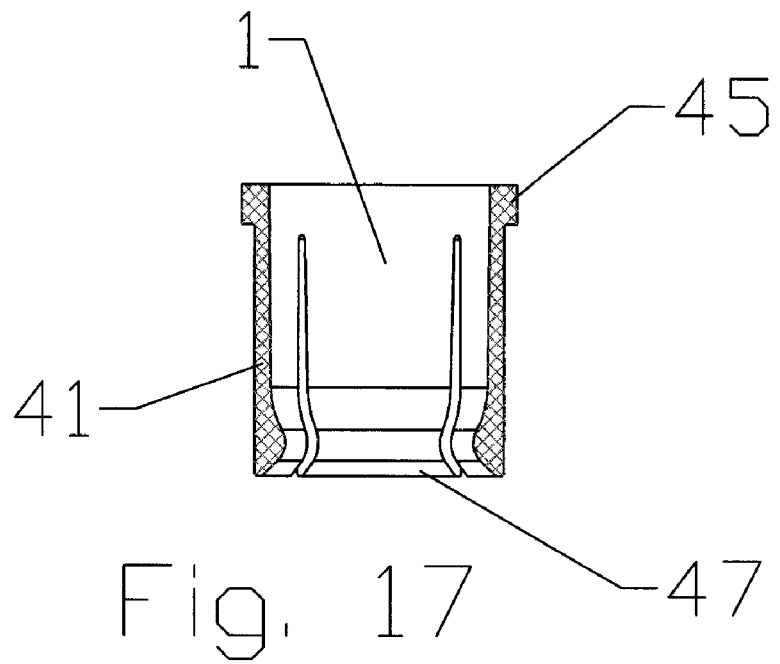
FIG. 17 is a schematic cut-away side view of a spring finger portion of the back body of FIG. 15.
Figure 18:
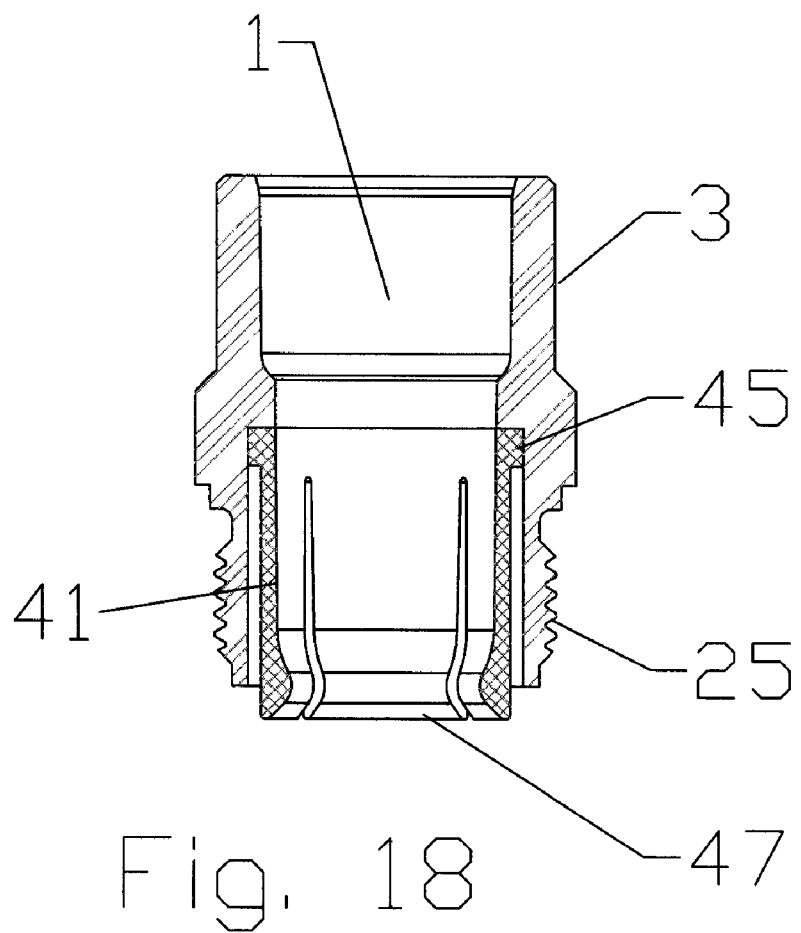
FIG. 18 is a schematic cut-away side view of the back body of FIG. 15.

As shown in FIGS. 15 and 16, additional alternative configurations also eliminate the clamp spring 11 by forming the coupling body 3 with spring finger(s) 41. A representative coupling body and associated connector body 7 retaining lip 43 are disclosed in detail in U.S. Utility Pat. No. 7,435,135, "Annular Corrugated Coaxial Cable Connector with Polymeric Spring Finger Nut" by Jim Wlos, issued Oct. 14, 2008, co-owned with the present application by Andrew LLC and hereby incorporated by reference in the entirety. The resulting connector has only two primary elements. To improve strength characteristics of the spring finger(s) 41, a spring finger portion 45 may be first formed from the injection moldable metal composition as shown in FIG. 17, over which the remainder of the coupling body 3 is molded from polymer material, as shown in FIG. 18. Environmental seal(s) 31, for example between the coupling body 3 and the cable outer conductor and or sheath may also be added, as described herein above.

Figure 19:
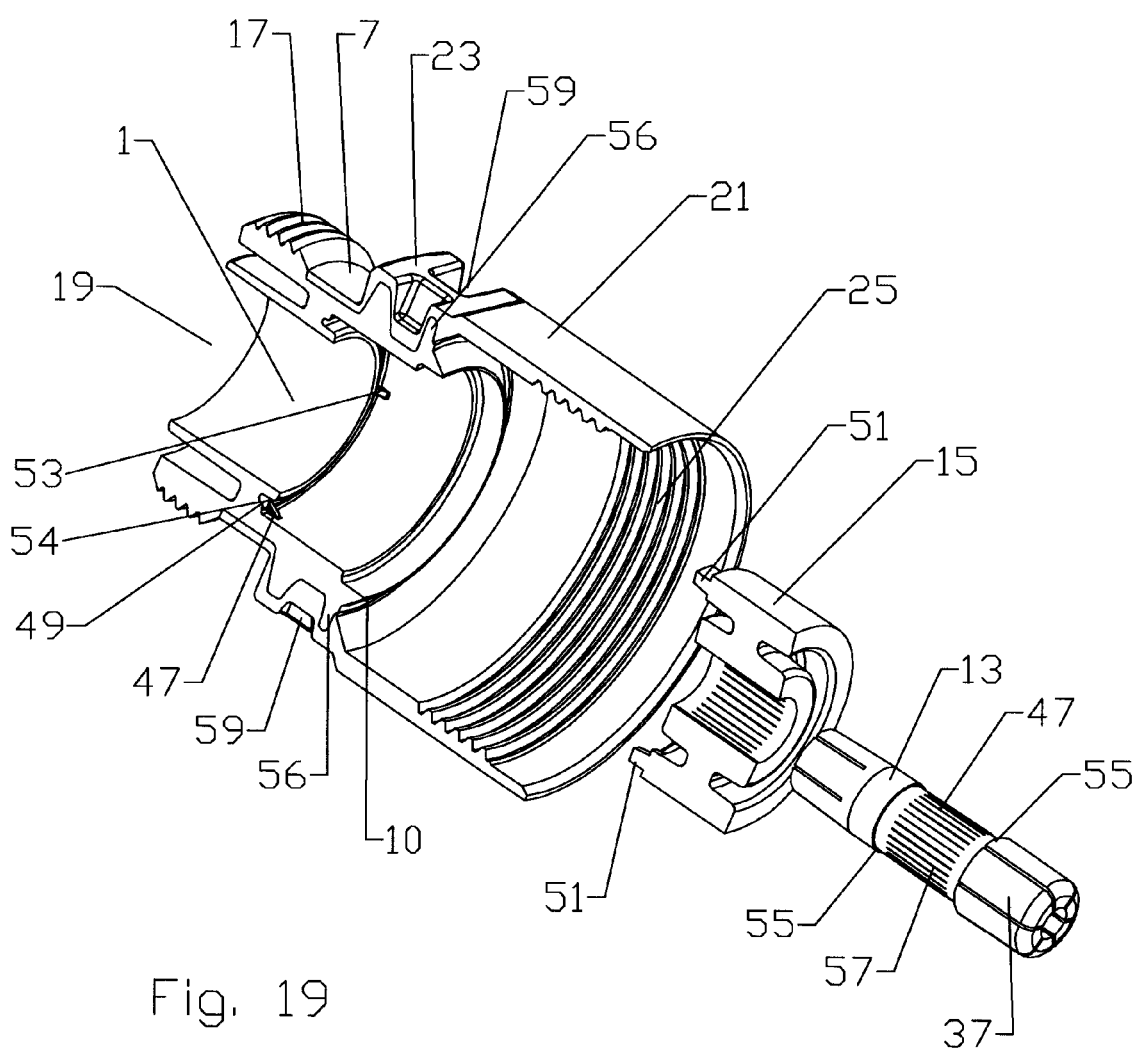
FIG. 19 is a schematic isometric exploded cut-away side view of a further exemplary connector body.
Figure 20:
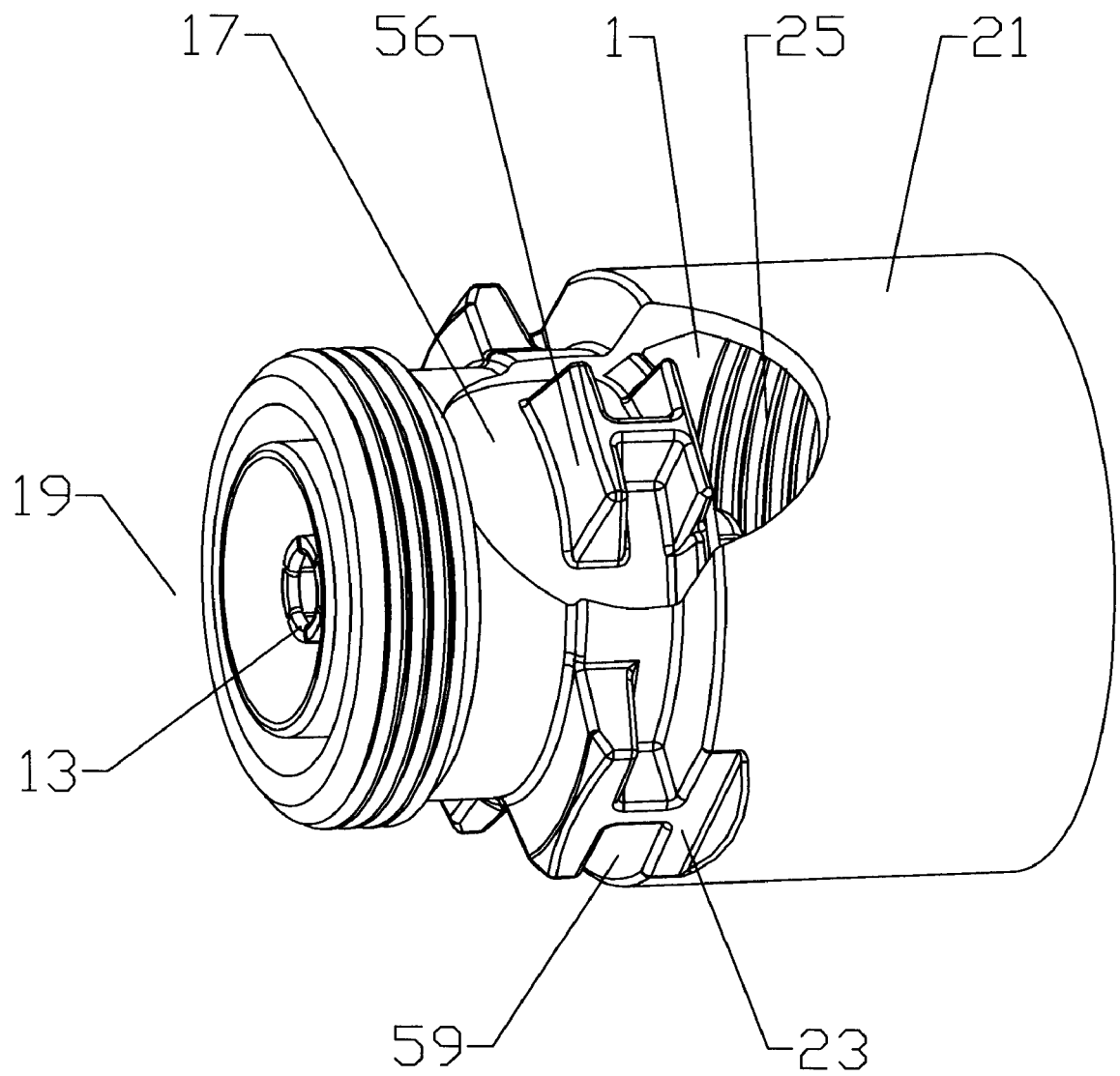
FIG. 20 is a schematic isometric external partial cut-away view of the connector body of FIG. 19.
Figure 21:
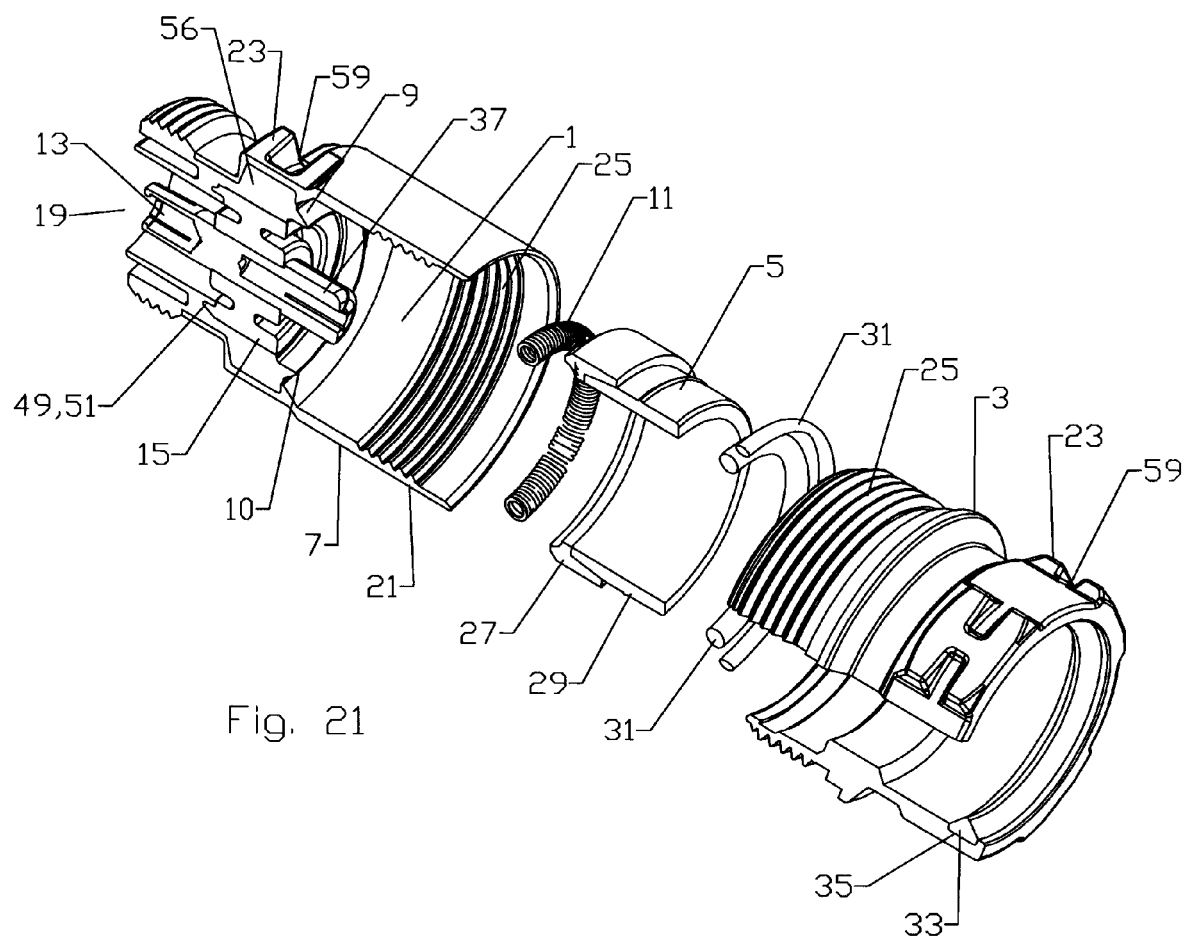
FIG. 21 is a schematic isometric exploded cut-away side view of an exemplary connector with the connector body of FIG. 19.

As shown in FIGS. 19-21, the connector configuration may be further enhanced, for example with respect to connector layer interlocking, environmental sealing, material requirement reduction and/or tool flat 23 integrity.

Connector layer interlocking may be applied to ensure that the various layers of the connector remain interlocked, for example as significant rotational and/or axial forces are applied during connector to cable and/or connector to connector assembly. Although the direct molding of the layers upon one another and/or shrinkage characteristic differentials of the selected materials may provide a significant layer interlock, further interlocking may be applied via application of interlock feature(s) 47, for example as groove(s) 49 and/or ridges on the inner contact 13 and/or the inner diameter of the inner body 17.

To take advantage of shrinkage characteristic differentials between materials during molding, for example between the dielectric insulator 15 and the inner body 17, the interlock feature 47 may be provided, for example, as a groove 49 of the inner body 17 that mates with a lip 51 of the dielectric insulator 15, as best shown in FIG. 19. As the last molded layer is applied, the shrinkage characteristic differential between the metal and the polymer material will act upon the periphery of the groove 49 and/or lip 51, increasing the connector layer interlocking and also providing a continuous radial environmental seal between these layers.

Further interlock feature(s) 47 may be applied as protrusion(s) 53 for improved rotational interlock. Where the protrusion(s) 53 are positioned proximate a mold break point 54, protrusion(s) 53 that would require significant additional machining in a conventional connector manufacture procedure may be easily applied.

Connector layer interlocking between the dielectric insulator 15 and the inner contact 13 may be applied, for example, as shoulder(s) 55 between which the dielectric insulator 15 is molded for axial interlocking and as axial rib(s) 57 for rotational interlocking.

Improved polymer thickness uniformity may reduce a required set time for the, for example, outer body 21 polymer molding step by minimizing areas of greater than average polymer thickness within the element. Thereby, polymer material requirements and the overall weight of the coaxial connector may be reduced. A primary area of increased material thickness in the outer body 21 is located proximate the tool flat(s) 23. By forming the tool flat(s) 23 with material reduction groove(s) 59 polymer material thickness with respect to the closest external surface may be significantly reduced.

The relatively soft polymer material tool flat(s) 23 of a connector may be damaged by application of wrenches of incorrect size and/or inadequate precision. As best shown in FIG. 20, to improve the integrity of the tool flat(s) 23, the inner body 17 may be provided with reinforcing tool flat support(s) 49 around which the tool flat(s) 23 of the outer body 21 may then be further formed during the outer body 21 molding step. The tool flat support(s) 56 also aid in reducing areas of increased material thickness and provide substantial connector layer interlocking as described herein above. As shown in FIG. 21, material reduction groove(s) may also be applied to tool flat(s) 23 of the coupling body 23.

Figure 22:
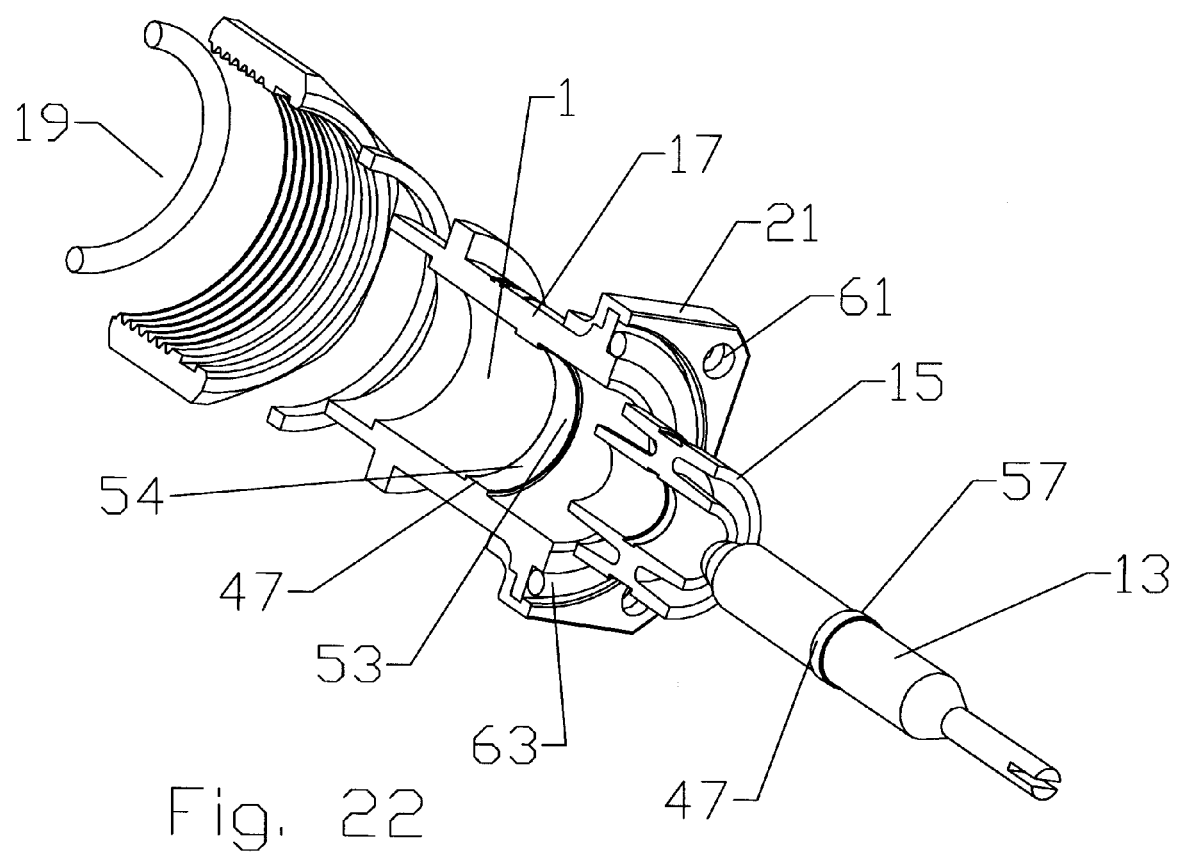
FIG. 22 is a schematic isometric exploded cut-away side view of an exemplary panel mount connector.
Figure 23:
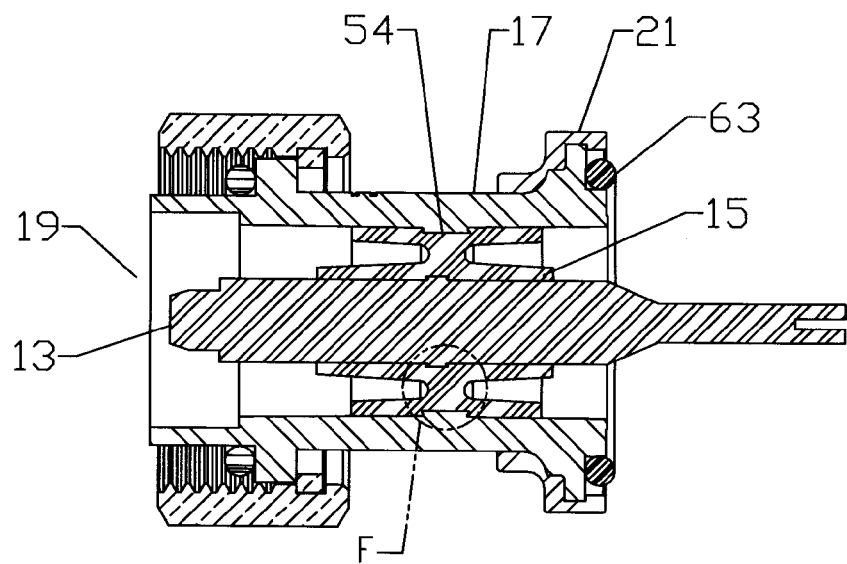
FIG. 23 is a schematic side view of the panel mount connector of FIG. 22.
Figure 24:
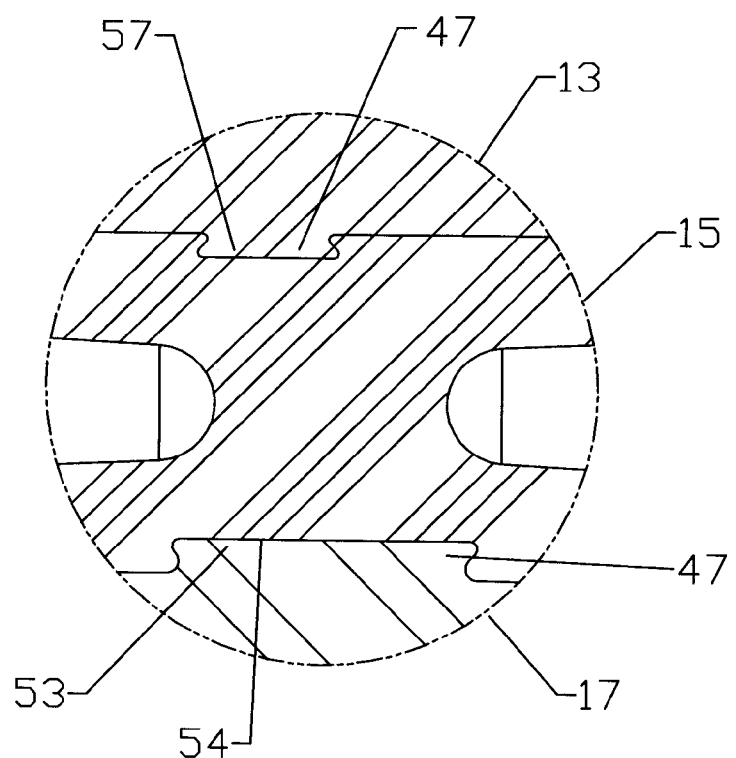
FIG. 24 is a schematic close-up view of area F of FIG. 23.
Figure 25:
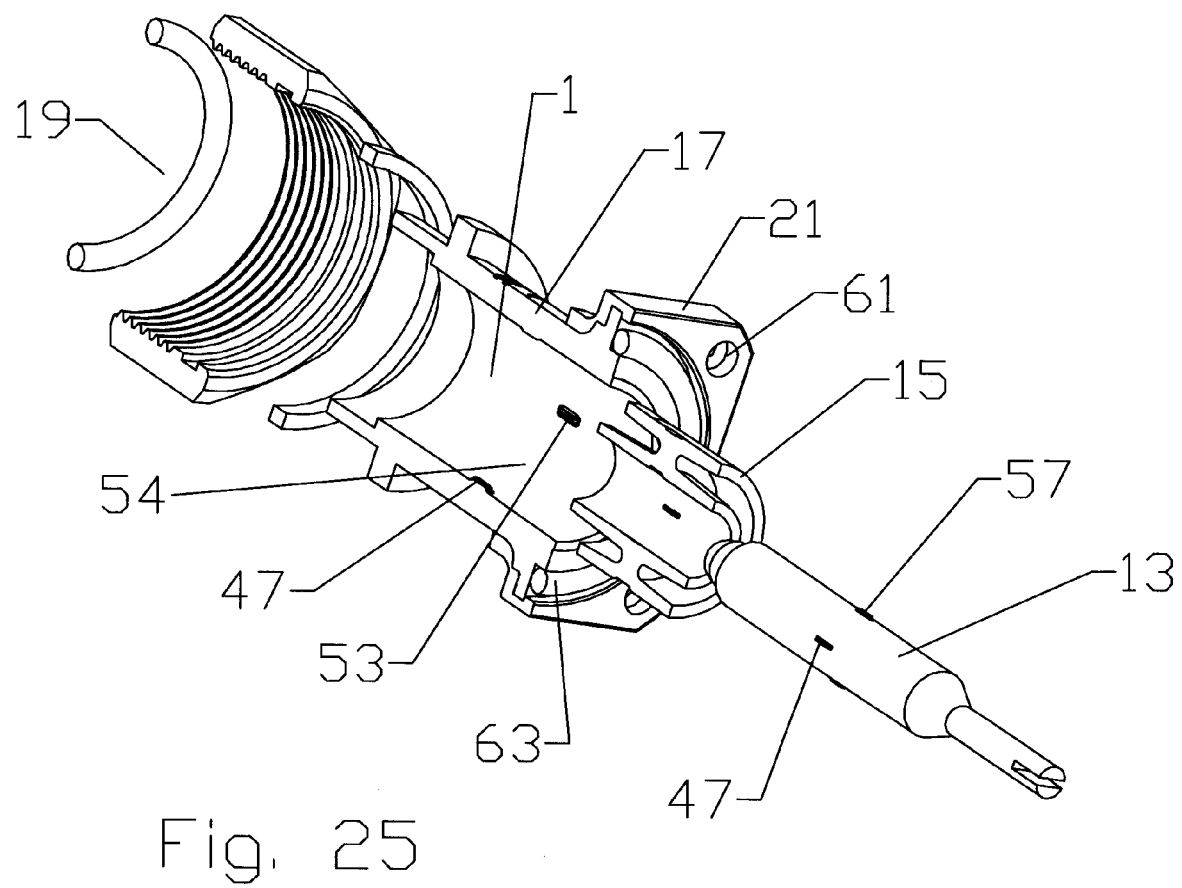
FIG. 25 is a schematic isometric exploded cut-away side view of an alternative exemplary panel mount connector.
Figure 26:
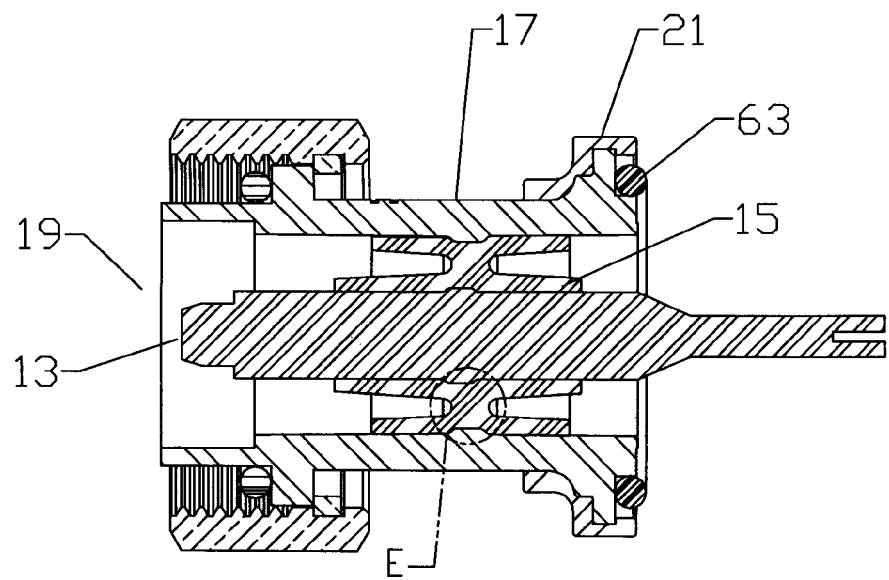
FIG. 26 is a schematic side view of the panel mount connector of FIG. 25.
Figure 27:
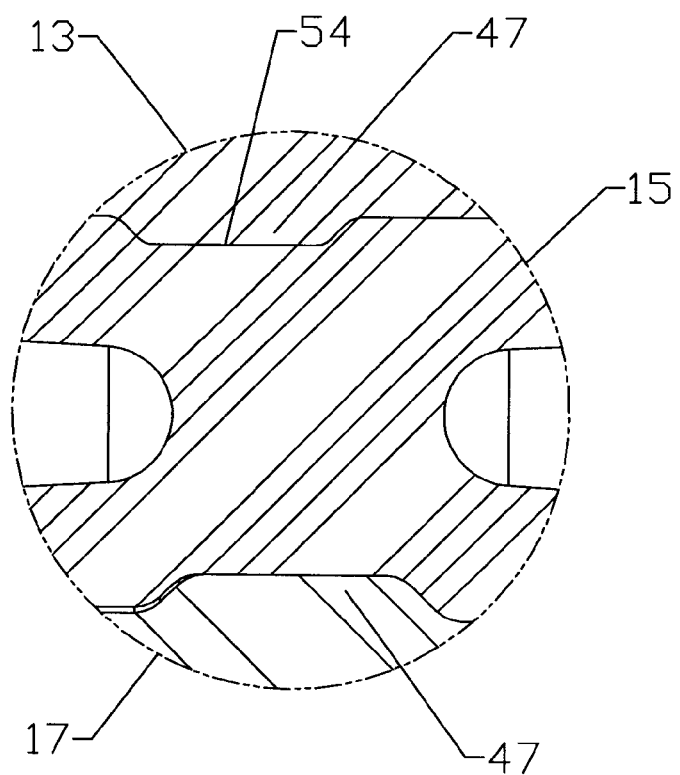
FIG. 27 is a schematic close-up view of area E of FIG. 26.

FIGS. 22-24 demonstrate panel mount coaxial connector embodiments with interlock feature(s) 47 formed as annular protrusion(s) 53 operative as radial, axial and environmental seals. FIGS. 25-29 demonstrate discrete protrusion(s) 53 as the interlock feature(s) 47 providing a connector configuration with reduced impact upon connector pass through electrical characteristics. By minimizing or eliminating internal features such as the substantial annular steps and/or shoulders applied to seat and retain a press-fit insulator within a typical conventional machined connector configuration, requirements for further compensation tuning to obtain satisfactory electrical performance may be reduced.

Another feature demonstrated in the connector embodiments of FIGS. 22-29 is application of an outer body 21 polymer layer operative as an insulator for the panel mount connector to reduce galvanic corrosion that may occur with respect to fasteners applied to mount the connector upon the panel. The outer body 21 may be applied around the mounting hole(s) 61, providing a galvanic break between the mounting hole(s) 61 and also between the inner body 17 and the panel, for areas of the inner body 17 outside of a sealing gasket 63 applied between the inner body 17 and the panel.

Figure 28:
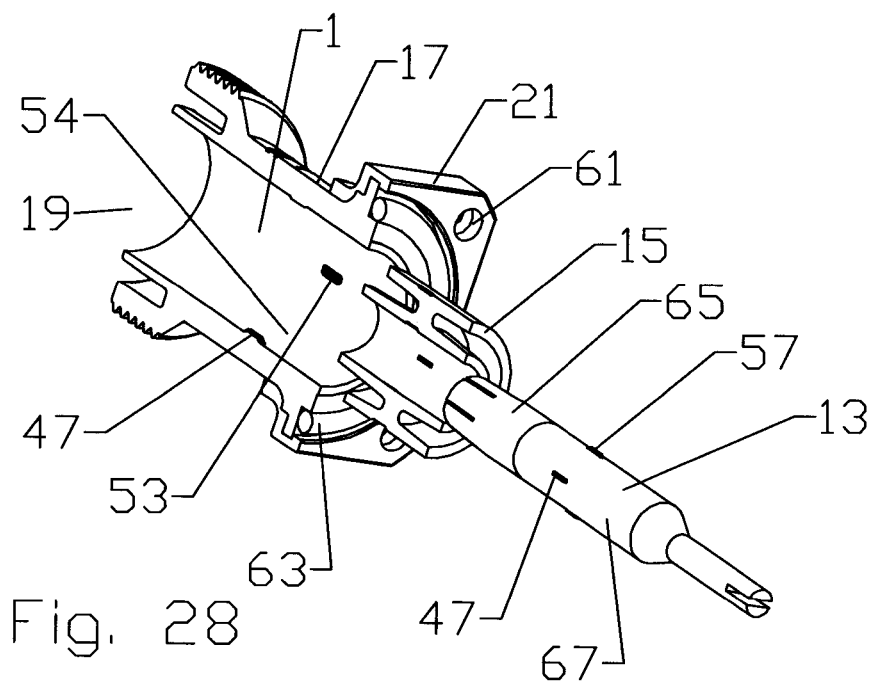
FIG. 28 is a schematic isometric exploded cut-away side view of another exemplary panel mount connector.
Figure 29:
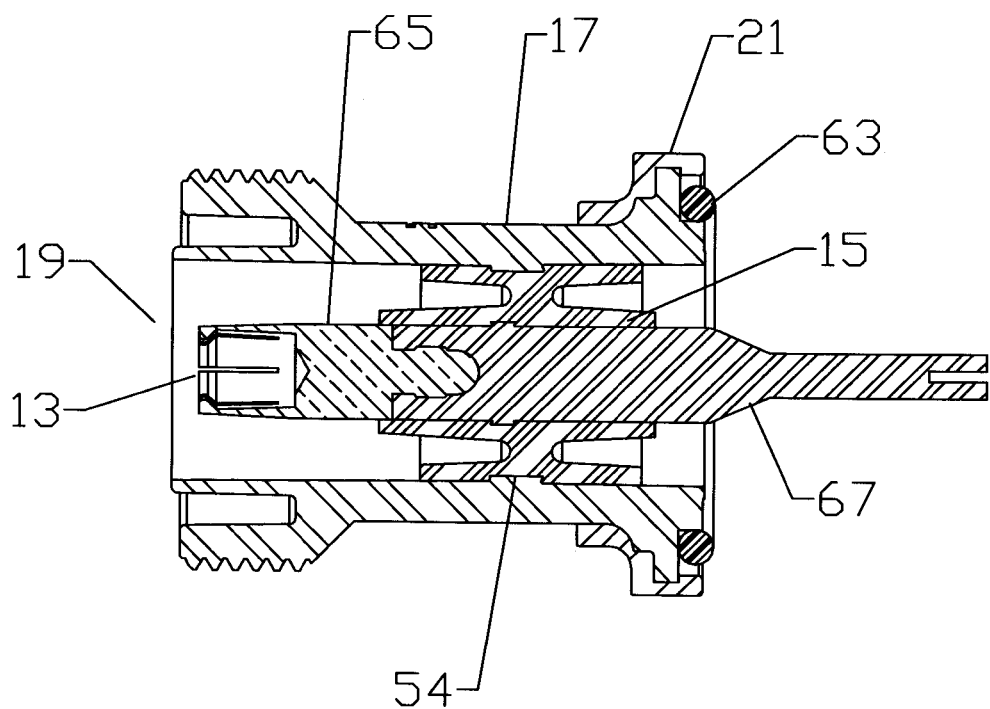
FIG. 29 is a schematic side view of the panel mount connector of FIG. 28.

In a further variation, as demonstrated in FIGS. 28 and 29, the inner contact 13 may be provided with a machined portion 65 including a spring basket or the like upon which the remainder of the inner contact 13, a molded portion 67, is molded. By reducing the machined portion 65 of the inner contact 13 to only that necessary to provide the benefits of the machined metal alloy, such as a spring characteristic for the spring basket, the material costs and/or machining requirements of the inner contact 13 may be reduced.

By minimizing the use of metal, and further the possible substitution of reduced cost metal alloys where applicable, the invention may provide a significant materials cost and weight savings. By replacing metal machining with injection molding technology, the number of separate sub-elements is significantly reduced, manufacturing is simplified, numerous assembly steps are eliminated and the required skill level(s) of manufacturing personnel are each significantly reduced. Because numerous prior elements are multi-shot injection molded directly upon one another, the number of pathways between discrete components is reduced, resulting in a connector with fewer environmental seals that may provide improved long term sealing characteristics.

| Table of Parts | |
|---|---|
| 1 | bore |
| 3 | coupling body |
| 5 | slip ring |
| 7 | connector body |
| 9 | annular ramp surface |
| 10 | end face |
| 11 | clamp spring |
| 13 | inner contact |
| 15 | dielectric insulator |
| 17 | inner body |
| 19 | connection interface |
| 21 | outer body |
| 23 | tool flat |
| 25 | threads |
| 27 | spring mating surface |
| 29 | slip ring body |
| 31 | environmental seal |
| 33 | sheath seal |
| 35 | annular groove |
| 37 | spring basket |
| 39 | clamp ring surface |
| 41 | spring finger |
| 43 | retaining lip |
| 45 | spring finger portion |
| 47 | interlock feature |
| 49 | groove |
| 51 | lip |
| 53 | protrusion |
| 54 | mold break point |
| 55 | shoulder |
| 56 | tool flat support |
| 57 | rib |
| 59 | material reduction groove |
| 61 | mounting hole |
| 63 | sealing gasket |
| 65 | machined portion |
| 67 | molded portion |

Where in the foregoing description reference has been made to ratios, integers or components having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. A coaxial cable connector, comprising:
   a connector body multi-shot injection molded about an inner contact; the connector body comprising:
      a dielectric insulator of dielectric polymer molded between an outer diameter of the inner contact and a coaxial inner body of injection molded metal composition; and
      an outer body of polymer injection molded upon an outer diameter of the inner body.

2. The coaxial cable connector of claim 1, further including at least one interlock feature between the dielectric insulator and the inner body.

3. The coaxial cable connector of claim 2, wherein the at least one interlock feature is a groove of the inner body that mates with a lip of the dielectric insulator.

4. The coaxial cable connector of claim 3, wherein the at least one interlock feature is a protrusion in the groove.

5. The coaxial cable connector of claim 1, wherein the at least one interlock feature is a protrusion projecting inward from the inner body.

6. The cable connector of claim 1, further including a plurality of tool flats in an outer diameter of the outer body, the tool flats provided with material reduction grooves.

7. The cable connector of claim 6, wherein the tool flats are formed upon outward projecting tool flat supports of the inner body.

8. The cable connector of claim 1, wherein the outer body surrounds mounting holes of the inner body.

9. The cable connector of claim 1, wherein the inner contact is provided with a machined portion and a molded portion.

10. The coaxial connector of claim 1, wherein the injection molded metal composition is an alloy comprising zinc and aluminum.

11. A method for manufacturing a multi-shot injection molded coaxial cable connector, comprising the steps of:
    injection molding an inner body of injection moldable metal composition; a bore of the inner body provided with at least one interlock feature;
    injection molding a dielectric insulator between an inner contact and the inner body;
    injection molding an outer body of polymer upon an outer diameter surface of the inner body.

12. The method of claim 11, wherein the outer body surrounds mounting holes of the inner body.

13. The method of claim 11, wherein the at least one interlock feature is located proximate a mold break point.

14. The method of claim 11, further including a plurality of tool flats in an outer diameter of the outer body, the tool flats including at least one material reduction groove.

15. The method of claim 14, wherein the tool flats are formed upon tool flat supports projecting from the outer diameter of the inner body.

16. The method of claim 11, wherein the inner contact is provided with a machined portion and a molded portion.

17. The method of claim 16, wherein the molded portion is an injection moldable metal composition injection molded upon the machined portion.

18. The method of claim 11, further including the step of injection molding the inner contact of injection moldable metal composition.

19. The method of claim 11, wherein the injection moldable metal composition is an alloy comprising aluminum and zinc.

20. The method of claim 11, wherein the injection molding is performed at a temperature of 1100 degrees Fahrenheit or less.

\* \* \* \* \*